United States Patent
Yano et al.

(10) Patent No.: US 6,392,804 B1
(45) Date of Patent: May 21, 2002

(54) IMAGE-BLUR CORRECTING VIEWING-OPTICAL SYSTEM

(75) Inventors: Takaaki Yano, Hokkaido; Takayuki Ito, Saitama, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,204

(22) Filed: Aug. 9, 2000

(30) Foreign Application Priority Data

Aug. 10, 1999 (JP) .......................................... 11-226246

(51) Int. Cl.$^7$ ........................ G02B 27/64; G02B 23/00; G02B 13/00; G02B 7/02
(52) U.S. Cl. ........................ 359/557; 359/554; 359/399; 359/407; 359/744; 359/819
(58) Field of Search ................................. 359/399–409, 359/554–557, 642, 744, 808–821; 396/52–55; 348/208

(56) References Cited

U.S. PATENT DOCUMENTS

| | | | |
|---|---|---|---|
| 5,731,896 A | * 3/1998 | Baumann et al. | 359/554 |
| 5,751,485 A | * 5/1998 | Suzuki | 359/557 |
| 6,046,853 A | 4/2000 | Yano | 359/557 |
| 6,072,630 A | 6/2000 | Yano | 359/557 |
| 6,118,585 A | 9/2000 | Kanai | 359/557 |

FOREIGN PATENT DOCUMENTS

| | | |
|---|---|---|
| JP | 6-43365 | 2/1994 |
| JP | 6-308431 | 11/1994 |
| JP | 11109256 | 4/1999 |
| JP | 11194262 | 7/1999 |
| JP | 11194263 | 7/1999 |
| JP | 11194304 | 7/1999 |
| JP | 11264942 | 9/1999 |
| JP | 11271609 | 10/1999 |
| JP | 20089104 | 3/2000 |

* cited by examiner

*Primary Examiner*—Thong Nguyen
(74) *Attorney, Agent, or Firm*—Greenblum & Bernstein, P.L.C.

(57) ABSTRACT

An image-blur correcting viewing-optical system including an objective optical system, an image-erecting optical system and an eyepiece optical system. The objective optical system includes an image-blur correcting lens element which is driven in a direction perpendicular to the optical axis, and the image-blur correcting lens element satisfies the following condition:

$$1\ mm \leq \phi - \phi 0 \leq 3\ mm \qquad (1)$$

wherein
 $\phi$ designates a mechanical diameter of the image-blur correcting lens element; and
 $\phi 0$ designates the diameter of an axial open aperture of the first surface of the image-blur correcting lens element.

5 Claims, 9 Drawing Sheets

— d Line
······ g Line
--- C Line

-1.0   1.0
SPHERICAL
ABERRATION

CHROMATIC
ABERRATION

Fig.4B
B=23.1

-0.1   0.1
LATERAL
CHROMATIC
ABERRATION

-2.0   2.0
ASTIGMATISM

Fig.4D
B=23.1

-5.0(%)5.0
DISTORTION

-1.0   1.0
SPHERICAL
ABERRATION
CHROMATIC
ABERRATION

— d Line
--- g Line
--- C Line

Fig. 10B
B=23.2

-0.1   0.1
LATERAL
CHROMATIC
ABERRATION

Fig. 10C
B=23.2

-2.0   2.0
ASTIGMATISM

-5.0(%)5.0
DISTORTION

Fig. 13

Fig. 16A 
ER=3.0
-1.0    1.0
SPHERICAL
ABERRATION
CHROMATIC
ABERRATION

Fig. 16B 
B=24.1
— d Line
----- g Line
--- C Line
-0.1    0.1
LATERAL
CHROMATIC
ABERRATION

Fig. 16C 
B=24.1
— S
--- M
-2.0    2.0
ASTIGMATISM

Fig. 16D 
B=24.1
-5.0(%)5.0
DISTORTION

-1.0    1.0
SPHERICAL
ABERRATION

CHROMATIC
ABERRATION

— d Line
···· g Line
--- C Line

Fig. 22B
B=23.6

-0.1    0.1
LATERAL
CHROMATIC
ABERRATION

Fig. 22C
B=23.6

-2.0    2.0
ASTIGMATISM

-5.0(%)5.0
DISTORTION

IMAGE-BLUR CORRECTING VIEWING-OPTICAL SYSTEM

BACKGROUND OF THE INVENTION

1. Field of the Invention

The present invention relates to an image-blur correcting viewing-optical system which corrects blur of an image by driving an image-blur correcting lens element in a direction perpendicular to the optical axis in accordance with the magnitude of a shake imposed on the image-blur correcting viewing-optical system.

2. Description of the Related Art

Two types of image-blur correcting viewing-optical systems have been known in the art:

(i) one which employs a variable angle prism; and (ii) the other which employs an image-blur correcting lens element to be driven in a direction perpendicular to the optical axis.

In the case where a variable angle prism is employed (the above item (i)), since the boundary surfaces thereof exposed to air are flat, spherical aberration is inherently occurred, thereby chromatic aberration and decentering coma inevitably occur.

On the other hand, in the case where an image-blur correcting lens element is employed (the above item (ii)), since enough space for the image-blur correcting lens element to retreat has to be provided, and a space for a drive mechanism thereof is required accordingly, the size of the entire optical system has to be enlarged. The shape of the image-blur correcting lens element is, in particular, designed so that the shape of the exit pupil does not change even when the image-blur correcting lens element is decentered by the maximum amount in a direction perpendicular to the optical axis. Therefore the image-blur correcting lens element has to be made larger, still further, the thickness thereof also increases. Since the image-blur correcting lens element itself becomes heavier, a greater load is imposed on the drive mechanism thereof accordingly. As a result, a drive mechanism with strong driving force is required, which causes an increase in the size of the entire apparatus, and also causes an increase in production costs.

SUMMARY OF INVENTION

It is an object of the present invention to provide a small-sized image-blur correcting lens element, and further, provide a small-sized and light-weight image-blur correcting viewing-optical system in which the small-sized image-blur correcting lens element is employed.

In order to achieve the above-mentioned objects, there is provided an image-blur correcting viewing-optical system including an objective optical system, an image-erecting optical system and an eyepiece optical system. The objective optical system includes an image-blur correcting lens element which is driven in a direction perpendicular to the optical axis, and the image-blur correcting lens element satisfies the following condition:

$$1 \text{ mm} \leq \phi - \phi 0 \leq 3 \text{ mm} \quad (1)$$

wherein $\phi$ designates a mechanical diameter of the image-blur correcting lens element; and $\phi 0$ designates the diameter of an axial open aperture of the first surface of the image-blur correcting lens element.

The image-blur correcting viewing-optical system according to the present invention preferably satisfies the following condition:

$$0.04 < DEC/\phi < 0.2 \quad (2)$$

wherein

DEC designates the maximum value for the correcting of decentering with respect to the image-blur correcting lens element (Decentering Amount).

In the case where the objective optical system is constituted by a front lens group and a rear lens group, either one of which is arranged to be the image-blur correcting lens element, the objective optical system can satisfy the following condition:

$$0.6 < \phi c/\phi max < 1.1 \quad (3)$$

wherein $\phi c$ designates the diameter of an axial open aperture of the object-side surface of the rear lens group of the objective optical system; and $\phi max$ designates the diameter of an axial open aperture of the object-side surface of the front lens group of the objective optical system.

The image-blur correcting lens element is preferably made from light-weight plastics for the purpose of load-reduction for the drive mechanism.

The present disclosure relates to subject matter contained in Japanese Patent Application No. Hei-11-226246 (filed on Aug. 10, 1999) which is expressly incorporated herein by reference in its entirety.

BRIEF DESCRIPTION OF TEE DRAWINGS

The invention will be discussed below in detail with reference to the accompanying drawings, in which.

DESCRIPTION OF THE PREFERRED EMBODIMENTS

The present invention relates to the size (diameter) of an image-blur correcting lens element to be used in an image-blur correcting viewing-optical system in which the image-blur correcting lens element is driven in a direction perpendicular to the optical axis, and which includes an objective optical system, an image-erecting optical system, and an eyepiece optical system, in this order from the object. In this type of image-blur correcting viewing-optical systems, the diameter of an axial open aperture (a mechanical diameter) of a blur-correcting lens element has conventionally been designed to not to change the shape of the exit pupil at the time of the maximum decentering of the image-blur correcting lens element. In other words, the way of determining the diameter of the image-blur correcting lens element has been thought to be essential in an optical design. However, according to the inventors' analyses, even if the shape of the exit pupil slightly changes when the image-blur correcting lens element is driven for blur correction, image deterioration which may substantially influence the quality of an image to be viewed does not occur. Therefore unlike the conventional image-blur correcting lens element, the image-blur correcting lens element of the present invention can be made smaller, which is found to contribute to a small-sized and light-weight image-blur correcting viewing-optical system.

More specifically, in the case when a mechanical diameter of the image-blur correcting lens element is determined based on an axial open aperture thereof when there is no decentering, the diameter and thickness of the image-blur correcting lens element can be made smaller and thinner. Consequently, the entire viewing-optical apparatus can be made smaller, and the weight thereof can be made lighter (less heavier). Furthermore, even if the shape of the exit pupil varies upon the image-blur correcting lens element being decentered, an image to be viewed does not substantially suffer deterioration.

Condition (1) specifies, from the viewpoint of the above, the diameter (mechanical diameter) of the image-blur correcting lens element.

In connection with the above, a conventional image-blur correcting lens element is designed under the following condition so that the shape of the exit pupil does not change at the time of the maximum decentering (driven for blur-correction):

$$\phi = \phi 0 + (2 \times DEC) + \Delta$$

wherein $\Delta$ designates an excess amount for diameter.

The excess amount for diameter $\Delta$ is an amount added to the diameter of an axial open aperture, since all the area determined by the mechanical diameter $\phi$ cannot substantially be made as a light-ray passing area. Conventionally, the excess amount for diameter $\Delta$ is required to be 1 mm through 3 mm.

In contrast, in the embodiments of the present invention, the amount (i.e., 2×DEC) of movement of the image-blur correcting lens element to not to change the shape of the exit pupil upon blur correction is eliminated, while the excess amount for diameter $\Delta$ is maintained:

$$\phi = \phi 0 + \Delta$$

The above is the conception of condition (1).

If $\phi - \phi 0$ exceeds the lower limit of condition (1), he excess amount for diameter $\Delta$ becomes too small.

If $\phi - \phi 0$ exceeds the upper limit of condition (1), the reduction in weight and size for the blur-correcting lens element cannot effectively be made.

If the diameter of the blur-correcting lens element is designed within the limits of condition (1), when the objective optical system is viewed at a distance from the front thereof while the blur-correcting lens element is driven, the blur-correcting lens element can be seen traversing the light path (i.e., entering the light path). Therefore it is preferable that the support member for the blur-correcting lens element be painted black in order to prevent a lowering of contrast in the field of view.

Condition (2) specifies the maximum value for the correcting of decentering with respect to the image-blur correcting lens element in the objective optical system.

If DEC/$\phi 0$ exceeds the upper limit of condition (2), the blur-correcting sensitivity becomes too low, thereby (i) the amount of decentering-correction of the blur-correcting lens element becomes large, (ii) peripheral illumination becomes too small, (iii) the movement of the blur-correcting lens element becomes too apparent and obstructs the view; and still further, (iv) according to mechanical limitations of the blur-correcting mechanism, the range for blur correction is made narrower.

If DEC/φ0 exceeds the lower limit of condition (2), the blur-correcting sensitivity becomes too high, thereby the correcting of blur becomes impossible.

Condition (3) specifies the position of the blur-correcting lens element.

If φc/φmax exceeds the lower limit of condition (3), the front lens group and the rear lens group, either one of which is arranged to be the blur-correcting lens element of the objective optical system, are too distant from each other, which causes an increase in the size of the entire apparatus; and still further, since the power of the front lens group becomes too strong, the correcting of aberrations, in particular, spherical aberration and coma, is difficult.

If φc/φmax exceeds the upper limit of condition (3), the diameter of the rear lens group of the objective optical system becomes too large, which causes an increase in production costs and an increase in the size of the entire apparatus.

By forming the blur-correcting lens element from plastics, the weight reduction of the blur-correcting lens element can further be achieved, and an aspherical surface can easily be made thereon, thereby high optical performance can be obtained.

Specific numerical examples will herein be discussed. In the tables and diagrams, r designates the radius of curvature, d designates the lens thickness or space between lens surfaces, $N_d$ designates the refractive index of the d line, and ν designates the Abbe number. In the diagrams of chromatic aberration represented by spherical aberration, the solid line and the two types of dotted lines respectively indicate spherical aberration with respect to the d, g and C lines, and ER designates the diameter of the exit pupil (mm). In the diagrams of lateral chromatic aberration, the solid line and the two types of dotted lines respectively indicate magnification with respect to the d, g and C lines, and B designates the angle formed by the optical axis and an emitting light ray. Also, in the diagrams of astigmatism, S designates the sagittal image, M designates the meridional image, and B designates the angle formed by the optical axis and an emitting light ray.

In addition to the above, an aspherical surface which is symmetrical with respect to the optical axis is defined as follows:

$$x=Ch^2/\{1+[1-(1+K)C^2h^2]^{1/2}\}+A4h^4+A6h^6+A8h^8+A10h^{10}\ldots;$$

wherein:

x designates a distance from a tangent plane of an aspherical vertex;

C designates a curvature of the aspherical vertex (1/r);

h designates a distance from the optical axis;

K designates the conic coefficient;

A4 designates a fourth-order aspherical coefficient;

A6 designates a sixth-order aspherical coefficient;

A8 designates an eighth-order aspherical coefficient; and

A10 designates a tenth-order aspherical coefficient;

Embodiment 1

Figure 1:
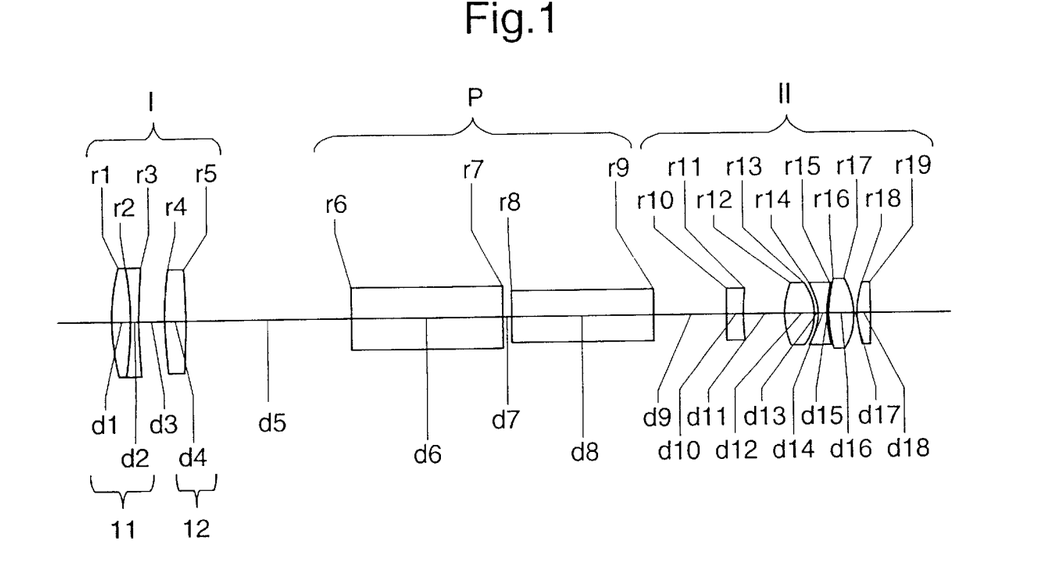
FIG. 1 is a lens arrangement of an image-blur correcting viewing-optical system of a viewing-optical apparatus (a blur-correcting telescope), according to a first embodiment of the present invention.
Figure 2:
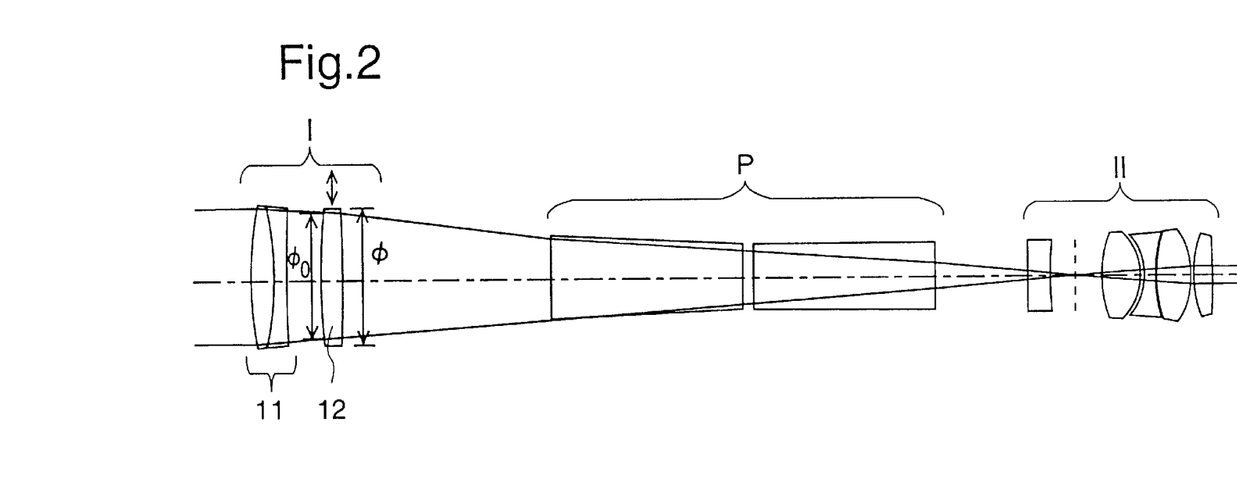
FIG. 2 is a view showing a state before an image-blur correcting lens element is driven.
Figure 3:
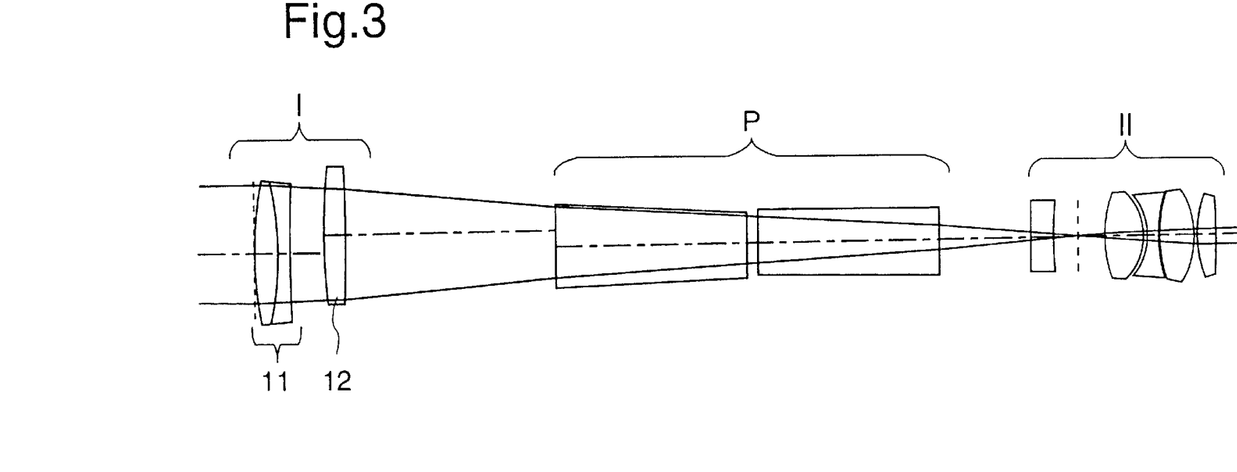
FIG. 3 is a view showing a state when the image-blur correcting lens element is driven.
Figures 4A, 4B:
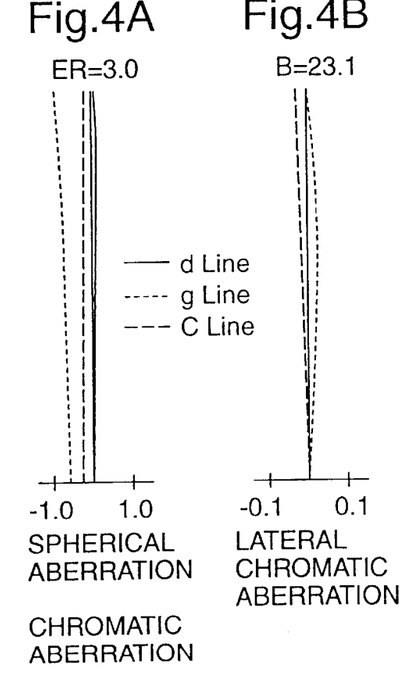
FIGS. 4A, 4B, 4C and 4D are aberration diagrams of the image-blur correcting viewing-optical system shown in FIG. 1.
Figure 4C:
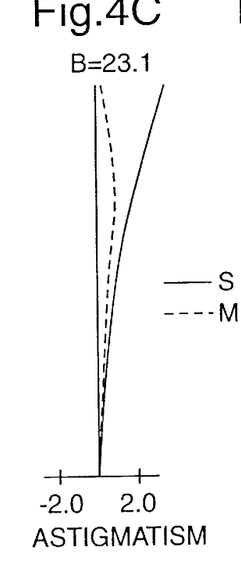
Figure 4D:
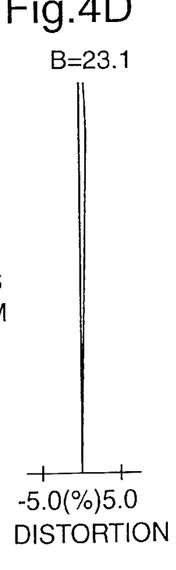
Figure 5:
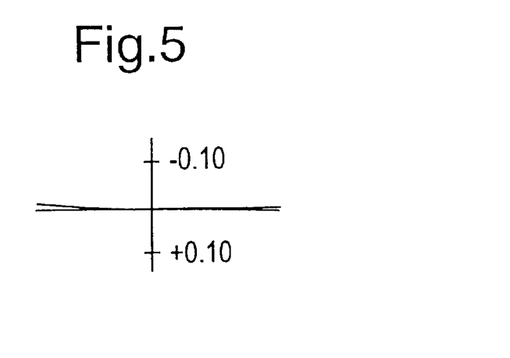
FIG. 5 shows axial coma before blur correction, with respect to the image-blur correcting viewing-optical system of FIG. 1.
Figure 6:
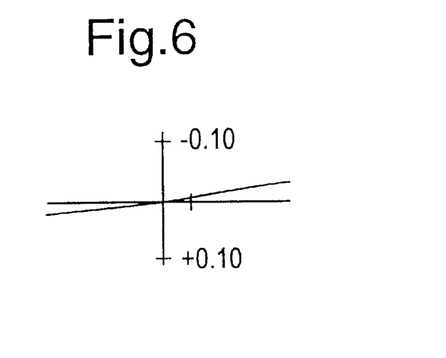
FIG. 6 shows axial coma when the image-blur correcting viewing-optical system of FIG. 1 is decentered to correct a blur angle of 1°.

FIGS. 1 through 6 show the first embodiment of the present invention applied to a blur-correcting telescope. FIG. 1 is a lens arrangement thereof. The optical system of the blur-correcting telescope includes an objective optical system I, an image-erecting optical system (image-erecting prism) P, and an eyepiece optical system II, in this order from the object. The objective optical system I includes a front lens group 11, and a rear lens group 12 which constitutes a blur-correcting lens group (element), in this order from the object. The eyepiece optical system II includes a negative lens element, a positive lens element, a negative lens element, a positive lens element and a positive lens element, in this order from the object. Table 1 shows the numerical data thereof. FIGS. 2 and 3 are views before and when an image-blur correcting viewing-optical system is driven. In FIG. 2, a mechanical diameter φ of the image-blur correcting lens element 12, and the diameter of an axial open aperture φ0 thereof which is a range where light rays pass through are indicated. FIGS. 4A, 4B, 4C and 4D are aberration diagrams of the optical system shown in FIG. 1. FIG. 5 shows axial coma before blur correction, with respect to the image-blur correcting viewing-optical system of FIG. 1. FIG. 6 shows axial coma when the image-blur correcting viewing-optical system of FIG. 1 is decentered to correct a blur angle of 1°.

TABLE 1

| Surface No. 1 | r | d | $N_d$ | ν |
|---|---|---|---|---|
| 1 | 70.950 | 4.000 | 1.51633 | 64.1 |
| 2 | −68.000 | 2.000 | 1.60342 | 38.0 |
| 3 | 202.339 | 6.220 | — | — |
| 4 | 120.000 | 4.000 | 1.49176 | 57.4 |
| 5* | −237.774 | 37.000 | — | — |
| 6 | ∞ | 34.000 | 1.56883 | 56.3 |
| 7 | ∞ | 2.000 | — | — |
| 8 | ∞ | 32.000 | 1.56883 | 56.3 |
| 9 | ∞ | 16.000 | — | — |
| 10 | −680.500 | 4.000 | 1.49176 | 57.4 |
| 11* | 35.849 | 9.230 | — | — |
| 12 | 23.936 | 6.770 | 1.49176 | 57.4 |
| 13* | −10.075 | 0.700 | — | — |
| 14 | −11.190 | 2.000 | 1.58547 | 29.9 |
| 15 | 25.294 | 0.200 | — | — |
| 16 | 24.157 | 6.200 | 1.49176 | 57.4 |
| 17 | −15.260 | 0.500 | — | — |
| 18 | 22.703 | 3.500 | 1.60311 | 60.7 |
| 19 | −75.123 | — | — | — |

*designates the aspherical surface which is rotationally symmetrical with respect to the optical axis.

Aspherical surface data (the aspherical surface coefficients not indicated are zero (0.00)):

| Surface No. | K | A4 |
|---|---|---|
| 5 | 0.00 | $0.2205 \times 10^{-6}$ |
| 11 | 0.00 | $-0.1753 \times 10^{-3}$ |
| 13 | −1.00 | $-0.4600 \times 10^{-5}$ |

Embodiment 2

Figure 7:
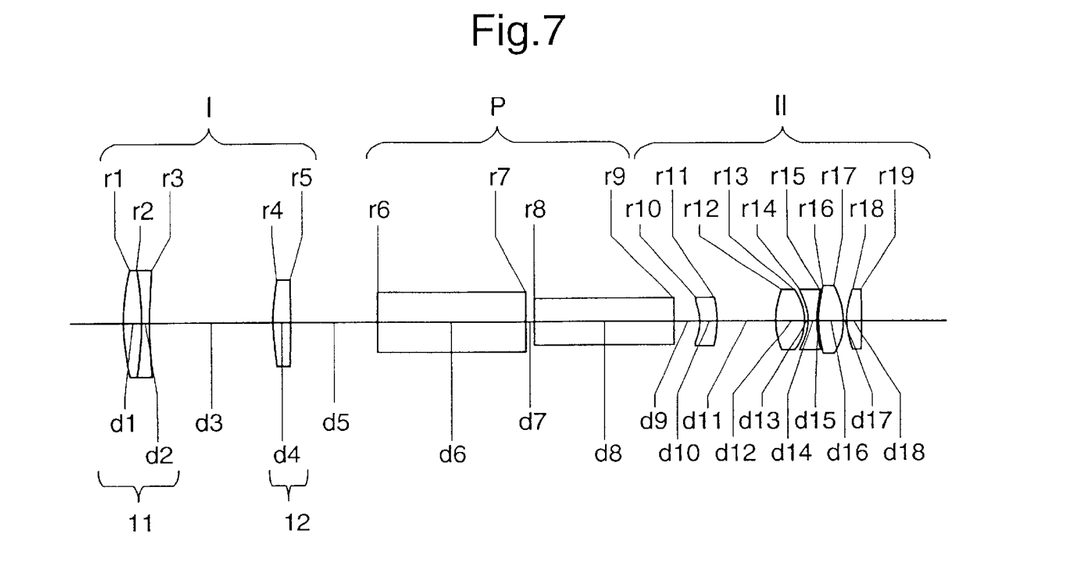
FIG. 7 is a lens arrangement of an image-blur correcting viewing-optical system of a viewing-optical apparatus (a blur-correcting telescope), according to a second embodiment of the present invention.
Figure 8:
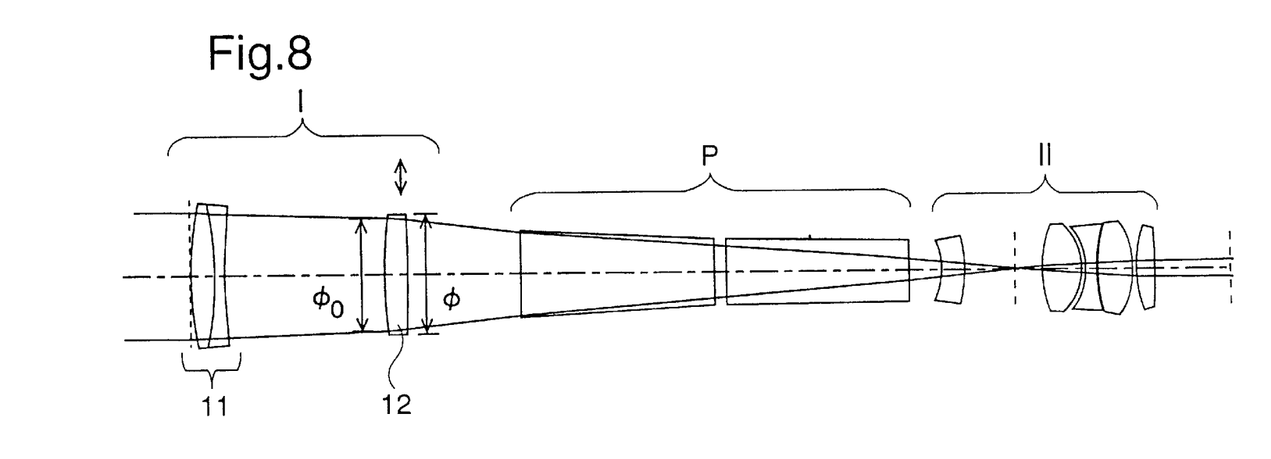
FIG. 8 is a view showing a state before an image-blur correcting lens element is driven.
Figure 9:
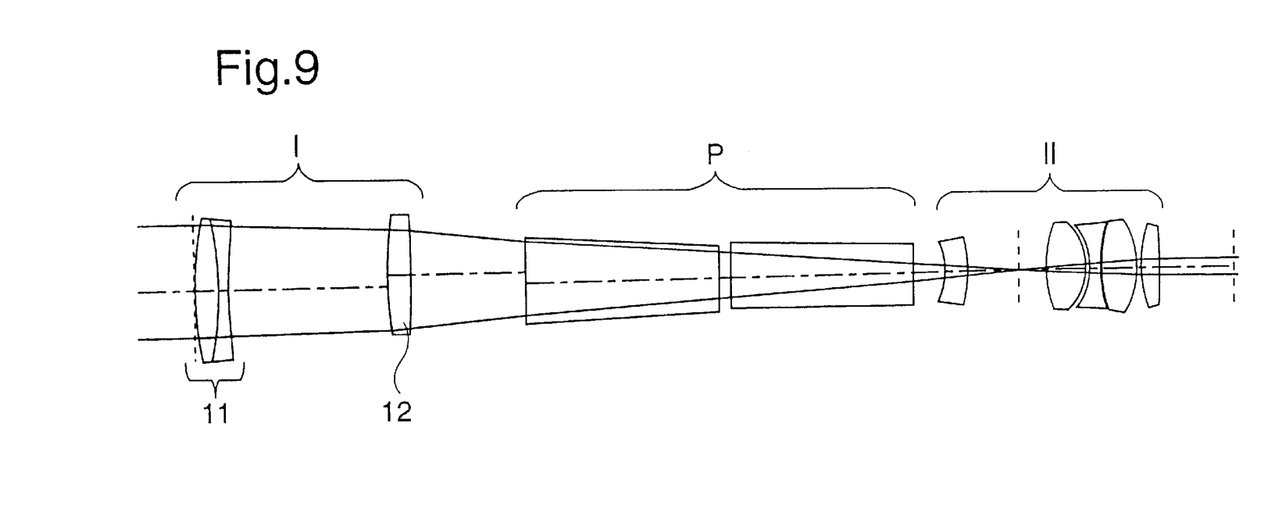
FIG. 9 is a view showing a state when the image-blur correcting lens element is driven.
Figures 10A, 10B:
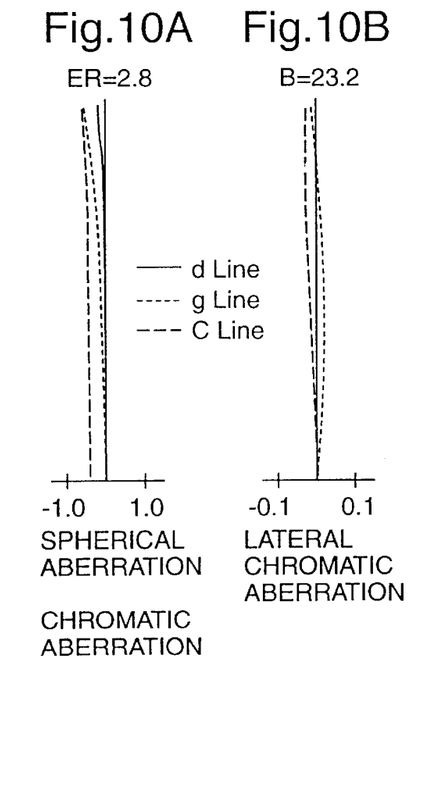
FIGS. 10A, 10B, 10C and 10D are aberration diagrams of the image-blur correcting viewing-optical system shown in FIG. 7.
Figure 10C:
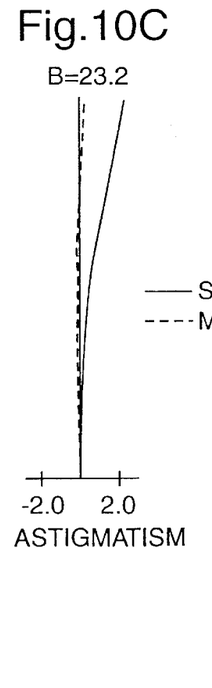
Figure 10D:
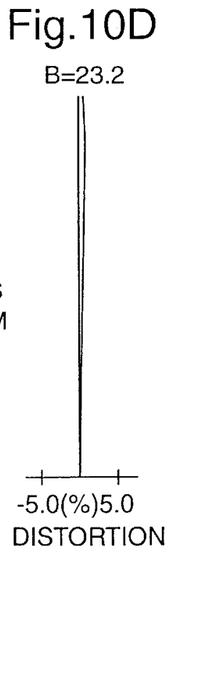
Figure 11:
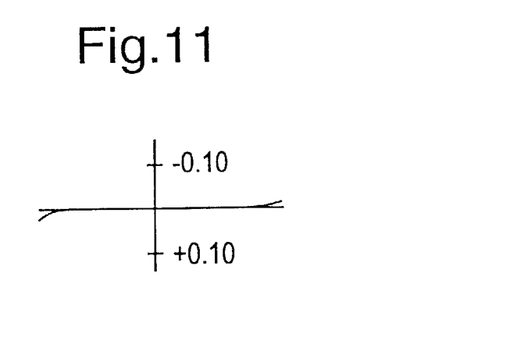
FIG. 11 shows axial coma before blur correction, with respect to the image-blur correcting viewing-optical system of FIG. 7.
Figure 12:
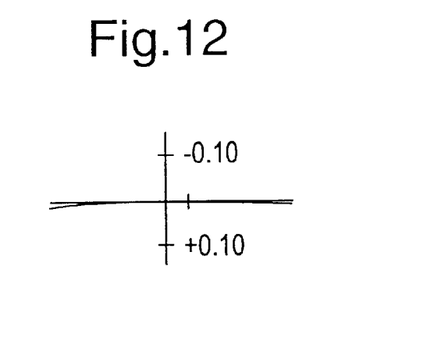
FIG. 12 shows axial coma when the image-blur correcting viewing-optical system of FIG. 7 is decentered to correct a blur angle of 1°.

FIGS. 7 through 12 show the second embodiment of the present invention applied to a blur-correcting telescope. FIG. 7 is a lens arrangement thereof Table 2 shows the numerical data thereof. FIGS. 8 and 9 are views before and when an image-blur correcting viewing-optical system is driven. In FIG. 8, a mechanical diameter φ of the image-blur correcting lens element, and the diameter of an axial open aperture φ0 thereof which is a range where light rays pass through are indicated. FIGS. 10A, 10B, 10C and 10D are aberration diagrams of the optical system shown in FIG. 7. FIG. 11 shows axial coma before blur correction, with respect to the image-blur correcting viewing-optical system of FIG. 7. FIG. 12 shows axial coma when the image-blur correcting viewing-optical system of FIG. 7 is decentered to correct a blur angle of 1°. The basic lens arrangement is the same as the first embodiment.

TABLE 2

| Surface No. 1 | r | d | $N_d$ | ν |
|---|---|---|---|---|
| 1 | 59.039 | 4.000 | 1.51633 | 64.1 |
| 2 | −85.520 | 2.000 | 1.60342 | 38.0 |
| 3 | 109.137 | 27.630 | — | — |
| 4 | 53.307 | 4.000 | 1.49176 | 57.4 |
| 5* | −1056.731 | 20.000 | — | — |
| 6 | ∞ | 34.000 | 1.56883 | 56.3 |
| 7 | ∞ | 2.000 | — | — |
| 8 | ∞ | 32.000 | 1.56883 | 56.3 |
| 9 | ∞ | 5.800 | — | — |
| 10 | −11.271 | 4.000 | 1.49176 | 57.4 |
| 11* | −27.245 | 13.470 | — | — |
| 12 | 23.936 | 6.770 | 1.49176 | 57.4 |
| 13* | −10.075 | 0.700 | — | — |
| 14 | −11.190 | 2.000 | 1.58547 | 29.9 |
| 15 | 25.294 | 0.200 | — | — |
| 16 | 24.157 | 6.200 | 1.49176 | 57.4 |
| 17 | −15.260 | 0.500 | — | — |
| 18 | 22.703 | 3.500 | 1.60311 | 60.7 |
| 19 | −75.123 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 |
|---|---|---|---|
| 5 | 0.00 | $0.5404 \times 10^{-6}$ | |
| 11 | 0.00 | $-0.1712 \times 10^{-3}$ | $-0.5402 \times 10^{-6}$ |
| 13 | −1.00 | $-0.4600 \times 10^{-5}$ | |

Embodiment 3

Figure 13:
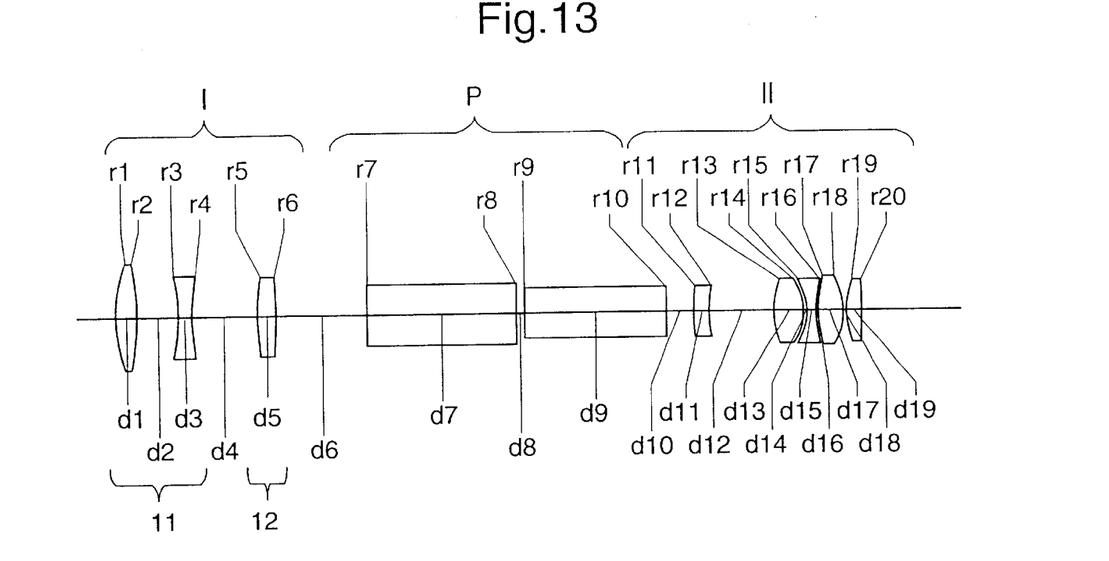
FIG. 13 is a lens arrangement of an image-blur correcting viewing-optical system of a viewing-optical apparatus (a blur-correcting telescope), according to a third embodiment of the present invention.
Figure 14:
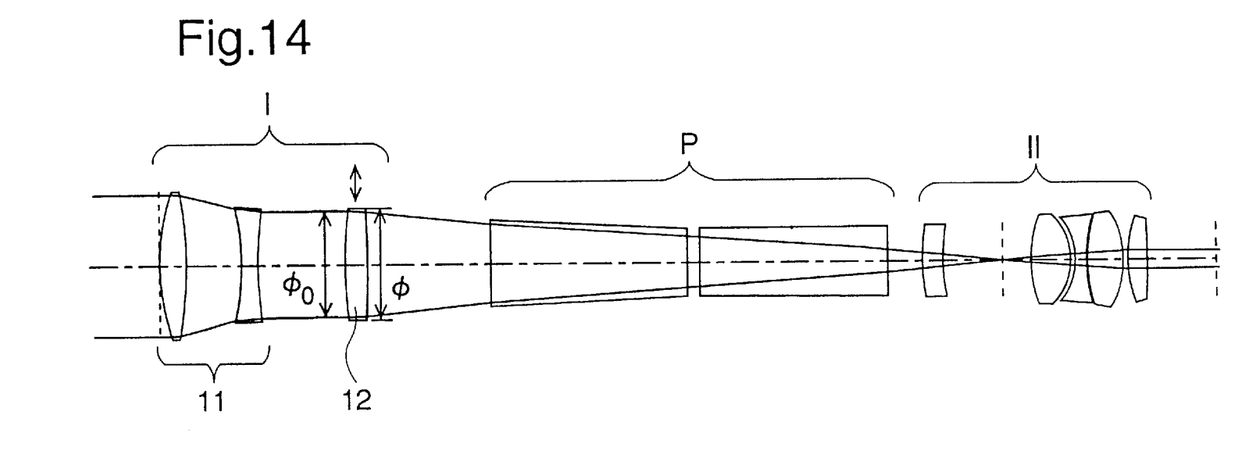
FIG. 14 is a view showing a state before an image-blur correcting lens element is driven.
Figure 15:
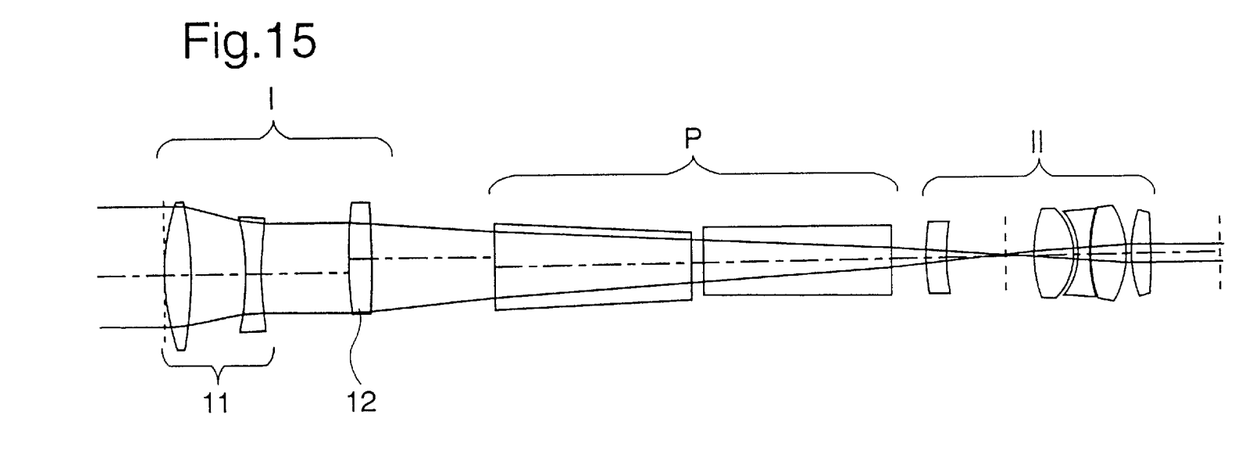
FIG. 15 is a view showing a state when the image-blur correcting lens element is driven.
Figures 16A, 16B:
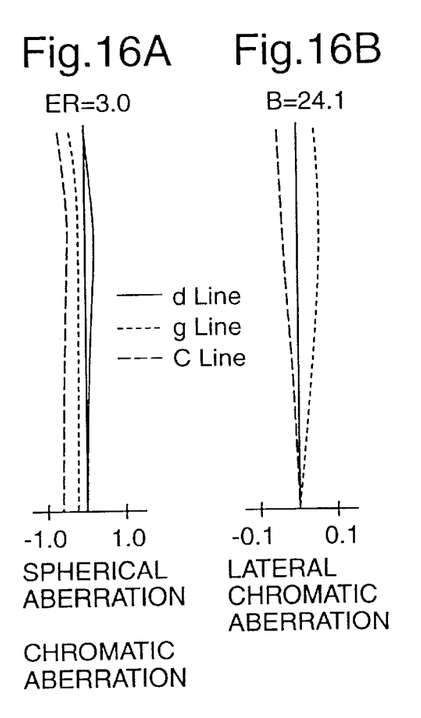
FIGS. 16A, 16B, 16C and 16D are aberration diagrams of the image-blur correcting viewing-optical system shown in FIG. 13.
Figures 16C, 16D:
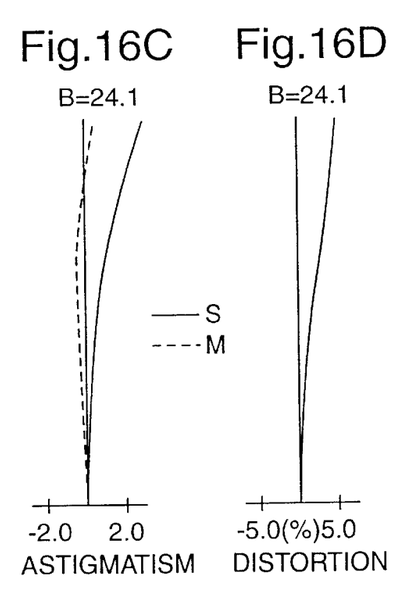
Figure 17:
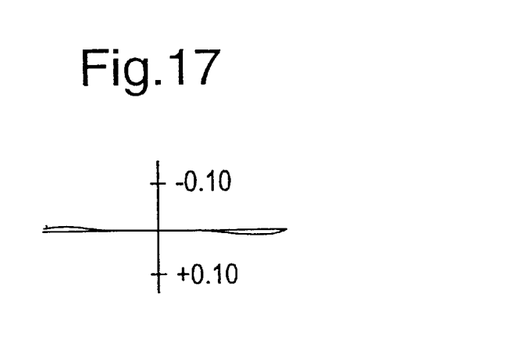
FIG. 17 shows axial coma before blur correction, with respect to the image-blur correcting viewing-optical system of FIG. 13.
Figure 18:
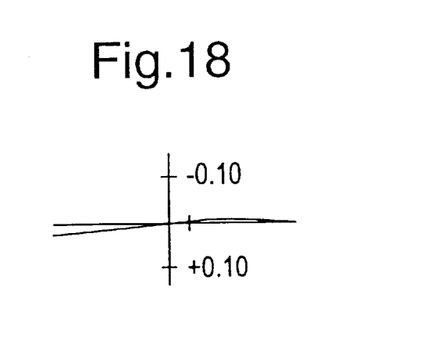
FIG. 18 shows axial coma when the image-blur correcting viewing-optical system of FIG. 13 is decentered to correct a blur angle of 1°.

FIGS. 13 through 18 show the third embodiment of the present invention applied to a blur-correcting telescope. FIG. 13 is a lens arrangement thereof. Table 3 shows the numerical data thereof. FIGS. 14 and 15 are views before and when an image-blur correcting lens element is driven. In FIG. 14, a mechanical diameter φ of the image-blur correcting lens element, and the diameter of an axial open aperture φ0 thereof which is a range where light rays pass through are indicated. FIGS. 16A, 16B, 16C and 16D are aberration diagrams of the optical system shown in FIG. 13. FIG. 17 shows axial coma before blur correction, with respect to the image-blur correcting viewing-optical system of FIG. 13. FIG. 18 shows axial coma when the image-blur correcting viewing-optical system of FIG. 13 is decentered to correct a blur angle of 1°. The basic lens arrangement is the same as the first embodiment.

TABLE 3

| Surface No. 1 | r | d | $N_d$ | ν |
|---|---|---|---|---|
| 1 | 33.751 | 4.500 | 1.51633 | 64.1 |
| 2 | −101.342 | 9.310 | — | — |
| 3 | −48.241 | 3.000 | 1.60342 | 38.0 |
| 4 | 42.734 | 14.710 | — | — |
| 5* | 76.744 | 4.000 | 1.52580 | 52.1 |
| 6 | −106.471 | 20.830 | — | — |
| 7 | ∞ | 34.000 | 1.56883 | 56.3 |
| 8 | ∞ | 2.000 | — | — |
| 9 | ∞ | 32.000 | 1.56883 | 56.3 |
| 10 | ∞ | 6.000 | — | — |
| 11 | 67.152 | 3.500 | 1.49176 | 57.4 |
| 12* | 36.194 | 15.050 | — | — |
| 13 | 23.936 | 6.770 | 1.49176 | 57.4 |
| 14* | −10.075 | 0.700 | — | — |
| 15 | −11.190 | 2.000 | 1.58547 | 29.9 |
| 16 | 25.294 | 0.200 | — | — |
| 17 | 24.157 | 6.200 | 1.49176 | 57.4 |
| 18 | −15.260 | 0.500 | — | — |
| 19 | 22.703 | 3.500 | 1.60311 | 60.7 |
| 20 | −75.123 | — | — | — |

TABLE 3-continued

*designates the aspherical surface which is rotationally symmetrical with respect to the optical axis.

Aspherical surface data (the aspherical surface coefficients not indicated are zero (0.00)):

| Surface No. | K | A4 | A6 |
|---|---|---|---|
| 5 | 0.00 | $-0.9400 \times 10^{-6}$ | |
| 12 | 0.00 | $0.2920 \times 10^{-4}$ | $-0.9290 \times 10^{-6}$ |
| 14 | −1.00 | $-0.4600 \times 10^{-5}$ | |

Embodiment 4

Figure 19:
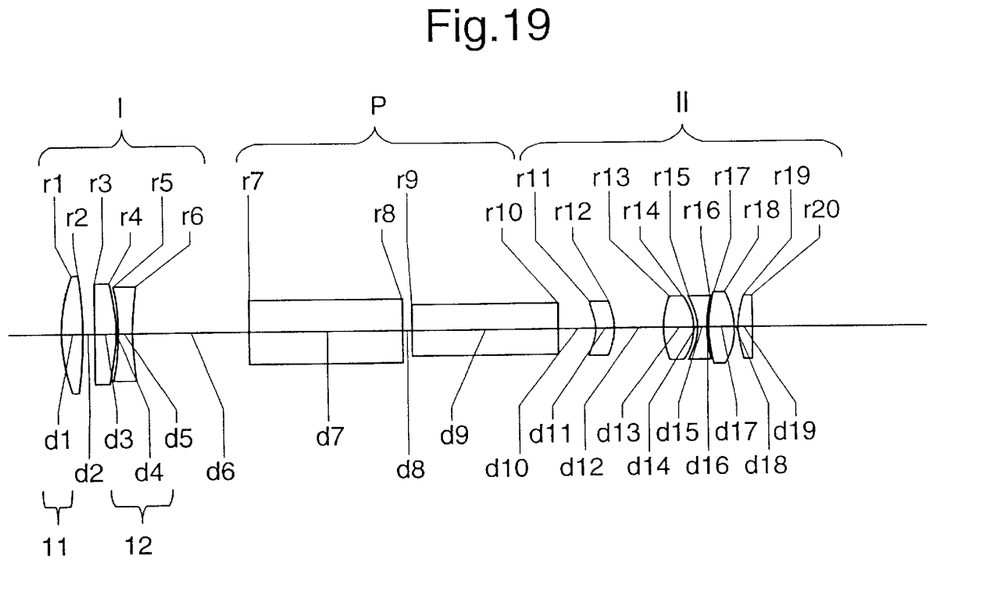
FIG. 19 is a lens arrangement of an image-blur correcting viewing-optical system of a viewing-optical apparatus (a blur-correcting telescope), according to a fourth embodiment of the present invention.
Figure 20:
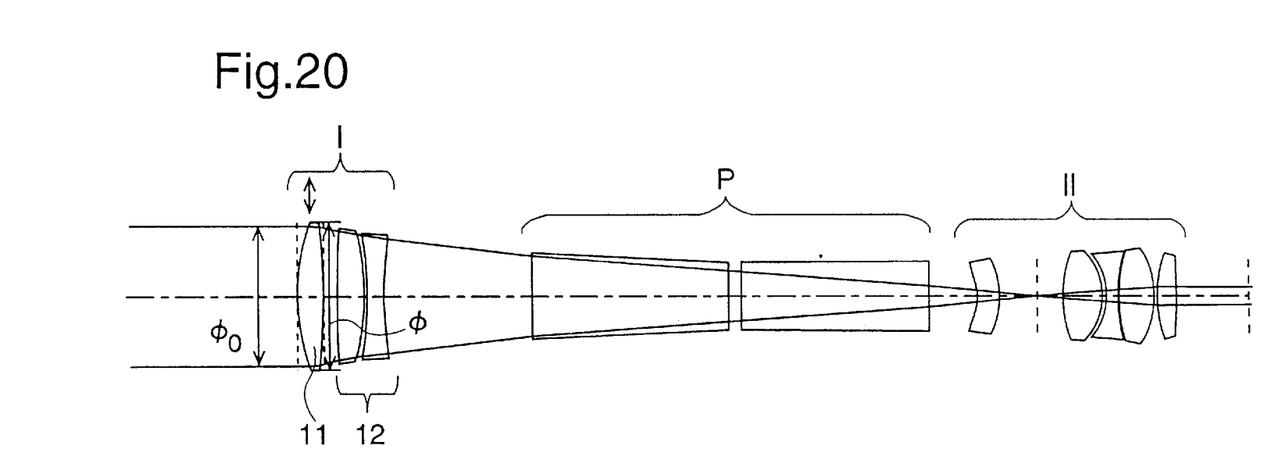
FIG. 20 is a view showing a state before an image-blur correcting lens element is driven.
Figure 21:
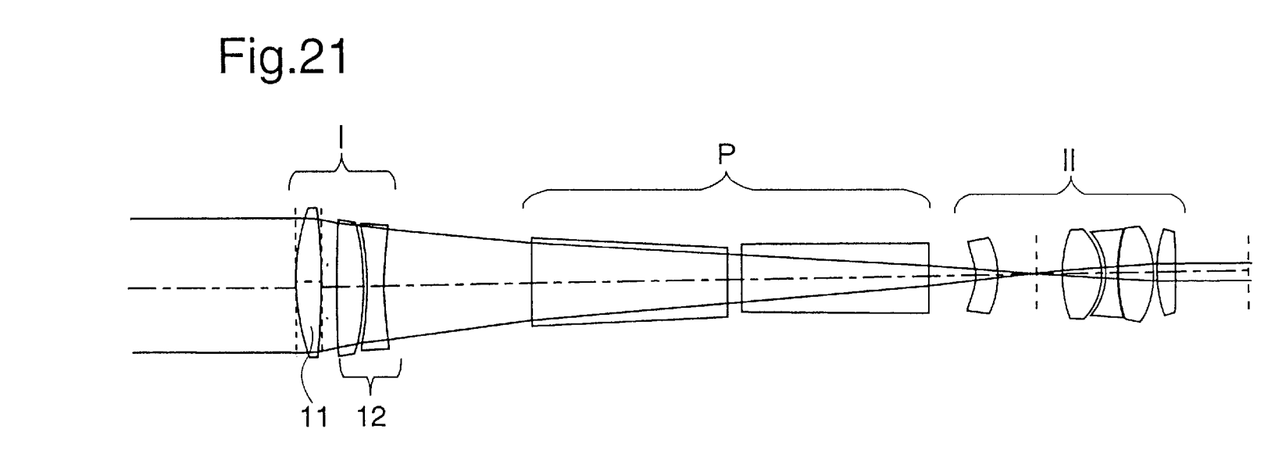
FIG. 21 is a view showing a state when the image-blur correcting lens element is driven.
Figure 22A:
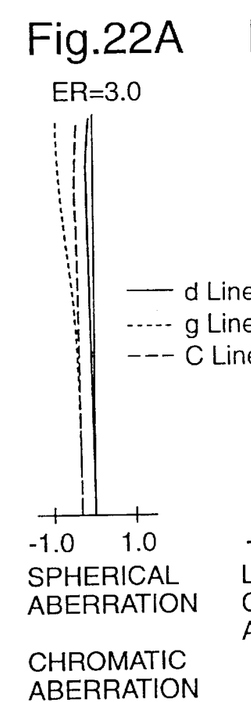
FIGS. 22A, 22B, 22C and 22D are aberration diagrams of the image-blur correcting viewing-optical system shown in FIG. 19.
Figure 22B:
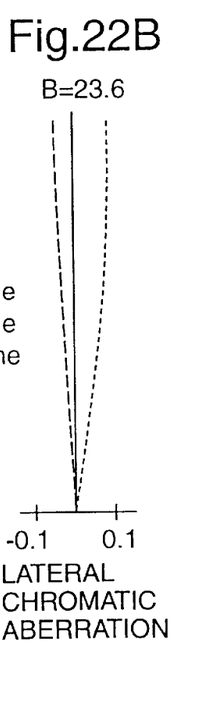
Figures 22C, 22D:
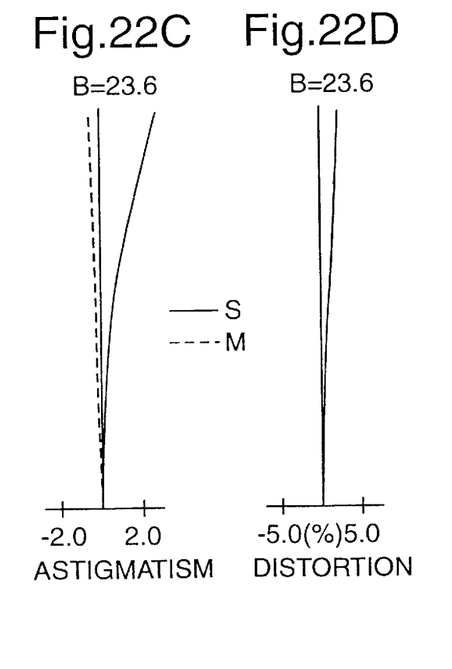
Figure 23:
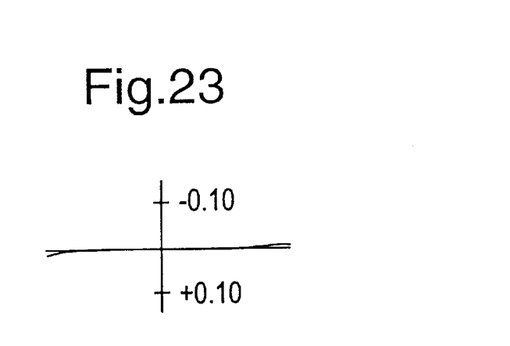
FIG. 23 shows axial coma before blur correction, with respect to the image-blur correcting viewing-optical system of FIG. 19.
Figure 24:
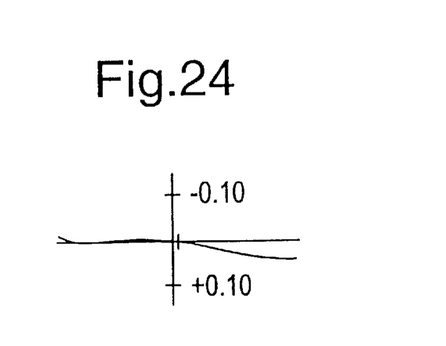
FIG. 24 shows axial coma when the image-blur correcting viewing-optical system of FIG. 19 is decentered to correct a blur angle of 1°.

FIGS. 19 through 24 show the fourth embodiment of the present invention applied to a blur-correcting telescope. FIG. 19 is a lens arrangement thereof. Table 4 shows the numerical data thereof. FIGS. 20 and 21 are views before and when an image-blur correcting lens element is driven. In FIG. 20, a mechanical diameter φ of the image-blur correcting lens element, and the diameter of an axial open aperture φ0 thereof which is a range where light rays pass through are indicated. FIGS. 22, 22B, 22C and 22D are aberration diagrams of the optical system shown in FIG. 19. FIG. 23 shows axial coma before blur correction, with respect to the image-blur correcting viewing-optical system of FIG. 19. FIG. 24 shows axial coma when the image-blur correcting viewing-optical system of FIG. 19 is decentered to correct a blur angle of 1°. The basic lens arrangement is the same as the first embodiment.

TABLE 4

| Surface No. 1 | r | d | $N_d$ | ν |
|---|---|---|---|---|
| 1 | 38.853 | 4.500 | 1.49176 | 57.4 |
| 2* | −99.683 | 2.650 | — | — |
| 3 | 1301.800 | 4.370 | 1.51633 | 64.1 |
| 4 | −45.801 | 0.500 | — | — |
| 5 | −46.568 | 3.000 | 1.60342 | 38.0 |
| 6 | −72.836 | 25.020 | — | — |
| 7 | ∞ | 34.000 | 1.56883 | 56.3 |
| 8 | ∞ | 2.000 | — | — |
| 9 | ∞ | 32.000 | 1.56883 | 56.3 |
| 10 | ∞ | 8.010 | — | — |
| 11 | −12.346 | 4.000 | 1.49176 | 57.4 |
| 12* | −17.374 | 10.790 | — | — |
| 13 | 23.936 | 6.770 | 1.49176 | 57.4 |
| 14* | −10.075 | 0.700 | — | — |
| 15 | −11.190 | 2.000 | 1.58547 | 29.9 |
| 16 | 25.294 | 0.200 | — | — |
| 17 | 24.157 | 6.200 | 1.49176 | 57.4 |
| 18 | −15.260 | 0.500 | — | — |
| 19 | 22.703 | 3.500 | 1.60311 | 60.7 |
| 20 | −75.123 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 |
|---|---|---|---|
| 2 | 0.00 | $0.2520 \times 10^{-5}$ | $-0.2720 \times 10^{-9}$ |
| 12 | 0.00 | $-0.9816 \times 10^{-4}$ | $-0.4227 \times 10^{-6}$ |
| 14 | -1.00 | $-0.4600 \times 10^{-5}$ | |

Table 5 shows the numerical values of each condition of each embodiment.

TABLE 5

| | Embod. (1) | Embod. (2) | Embod. (3) | Embod. (4) |
|---|---|---|---|---|
| Cond. (1) | 1.0 | 1.0 | 1.0 | 1.0 |
| Cond. (2) | 0.131 | 0.100 | 0.111 | 0.042 |
| Cond. (3) | 0.958 | 0.902 | 0.751 | 1.083 |

Each embodiment satisfies each condition, and aberrations are relatively well corrected.

As can be understood from the above description, a small-sized image-blur correcting lens element, and a small-sized and light-weight image-blur correcting viewing-optical system in which the small-sized image-blur correcting lens element is used, can be obtained.

What is claimed is:

1. An image-blur correcting viewing-optical system comprising an objective optical system, an image-erecting optical system and an eyepiece optical system;

wherein said objective optical system comprises an image-blur correcting lens element which is driven in a direction perpendicular to an optical axis; and wherein said image-blur correcting lens element satisfies the following condition:

$$1 \text{ mm} \leq \phi - \phi 0 \leq 3 \text{ mm}$$

wherein $\phi$ designates a mechanical diameter of said image-blur correcting lens element; and $\phi 0$ designates a diameter of an axial open aperture of a first surface of said image-blur correcting lens element, wherein the objective optical system, the image erecting optical system, and the eyepiece optical system define a telescope.

2. The image-blur correcting viewing-optical system according to claim 1, satisfies the following condition:

$$0.04 < DEC/\phi 0 < 0.2$$

wherein

DEC designates the maximum value for the correcting of decentering with respect to said image-blur correcting lens element.

3. The image-blur correcting viewing-optical system according to claim 1, wherein said objective optical system comprises a front lens group and a rear lens group, either one of which comprises said image-blur correcting lens element; and wherein said objective optical system satisfies the following condition:

$$0.6 < \phi c/\phi max < 1.1$$

wherein $\phi c$ designates the diameter of an axial open aperture of the object-side surface of said rear lens group of said objective optical system; and $\phi max$ designates the diameter of an axial open aperture of the object-side surface of said front lens group of said objective optical system.

4. The image-blur correcting viewing-optical system according to claim 1, wherein said image-blur correcting lens element is made from plastics.

5. The image-blur correcting viewing-optical system according to claim 1, wherein the image blur-correcting viewing-optical system is an afocal lens system.

* * * * *